(12) United States Patent
Szarka et al.

(10) Patent No.: US 7,079,813 B2
(45) Date of Patent: *Jul. 18, 2006

(54) EQUIPMENT LOCKOUT SYSTEM

(75) Inventors: Joseph R. Szarka, Wooster, OH (US); Torsten Rempe, Oklahoma City, OK (US); Max Heckl, Oklahoma City, OK (US)

(73) Assignee: American Augers, Inc., West Salem, OH (US)

( * ) Notice: Subject to any disclaimer, the term of this patent is extended or adjusted under 35 U.S.C. 154(b) by 771 days.

This patent is subject to a terminal disclaimer.

(21) Appl. No.: 09/942,800

(22) Filed: Aug. 30, 2001

(65) Prior Publication Data

US 2002/0081975 A1 Jun. 27, 2002

Related U.S. Application Data

(63) Continuation-in-part of application No. 09/158,418, filed on Sep. 22, 1998, now Pat. No. 6,285,860.

(51) Int. Cl.
*H04B 7/00* (2006.01)

(52) U.S. Cl. .................. 455/66.1; 455/345; 340/426.13

(58) Field of Classification Search .................. 455/66, 455/345, 346, 348; 340/426, 825.49, 679, 340/683
See application file for complete search history.

(56) References Cited

U.S. PATENT DOCUMENTS

| | | | |
|---|---|---|---|
| 4,087,781 A | 5/1978 | Grossi et al. | |
| 4,378,507 A | 3/1983 | Root | |
| 4,481,512 A | 11/1984 | Tscheulin et al. | |
| 4,958,084 A | 9/1990 | Carlo et al. | |
| 4,968,978 A | 11/1990 | Stolarczyk | |
| 5,025,175 A * | 6/1991 | Dubois, III | .................. 307/326 |
| 5,200,735 A | 4/1993 | Hines | |
| 5,345,138 A | 9/1994 | Mukaidono et al. | |
| 5,623,245 A | 4/1997 | Gilmore | |
| 6,778,097 B1 * | 8/2004 | Kajita et al. | ........... 340/825.69 |

FOREIGN PATENT DOCUMENTS

GB       002115151 A   *   9/1983

* cited by examiner

*Primary Examiner*—Fan Tsang
*Assistant Examiner*—Ming Chow

(57) ABSTRACT

An equipment lockout control system and method which provides a lockout function that inhibits one or more functions of the equipment being operated under predetermined operating conditions. The system includes at least one receiver, including an equipment inhibitor for disabling at least one function performed by the equipment. At least one portable transmitter operable by an operator is associated with the equipment and includes circuitry for generating a substantially continuous radio signal receivable by the receiver. The control system includes a means for rendering the equipment inhibitor ineffective, so long as the radio signal continues to be received by the receiver. The portable transmitter includes a means for broadcasting a stop signal upon actuation of an operator actuatable stop member forming part of the transmitter. In a more preferred embodiment, the system includes a second set of portable transmitters located at a remote location with each of the transmitters generating a continuous radio signal that is receivable by a relay/transmitter station. The relay/transmitter station in turn issues a continuous radio signal receivable by the receiver, so long as each of the remote portable transmitters maintains radio communication with the relay/transmitter unit. Each portable transmitter issues a continuous signal with embedded data related to the transmitter's address and its unique lockout status.

8 Claims, 6 Drawing Sheets

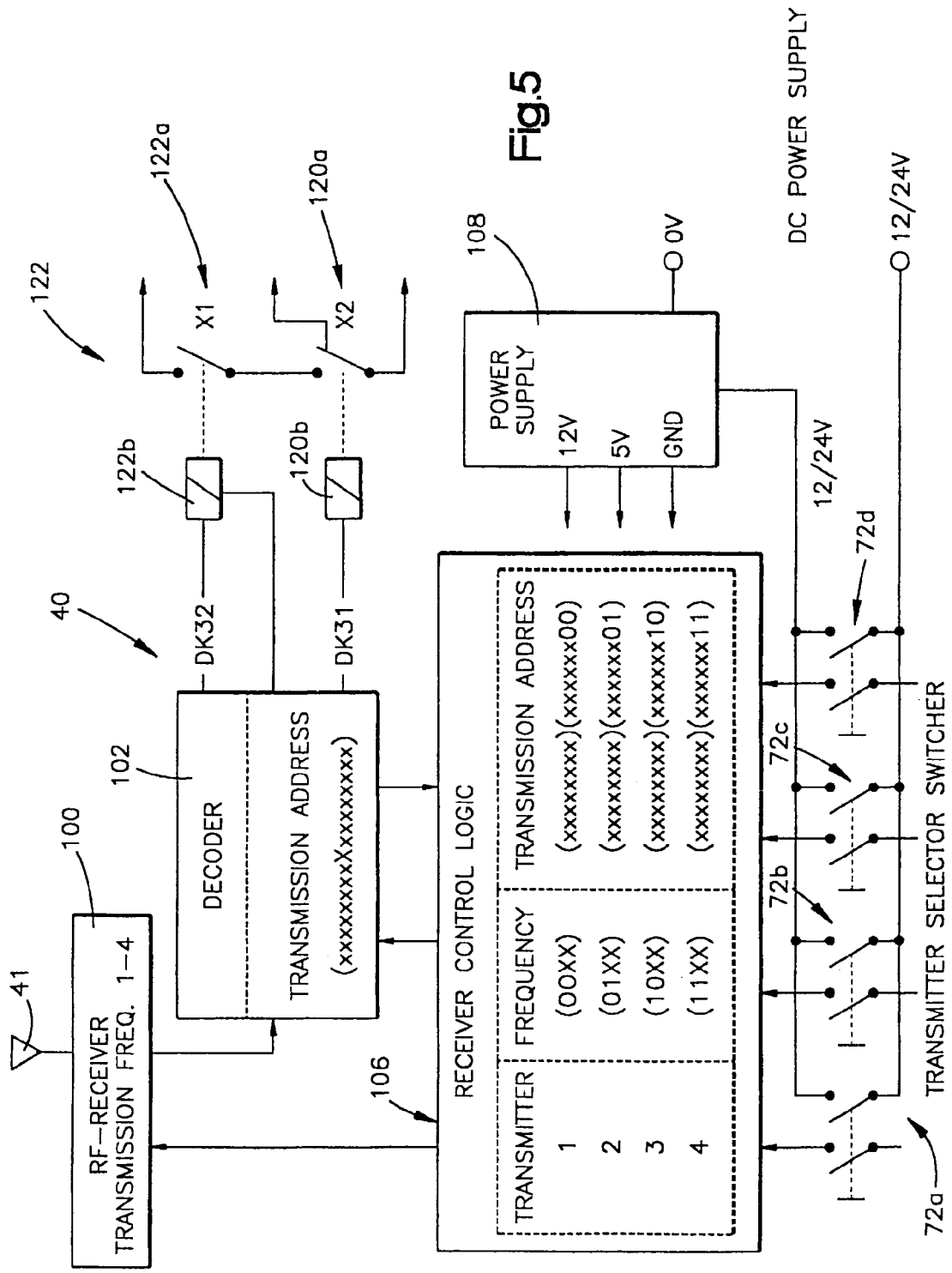

EQUIPMENT LOCKOUT SYSTEM

RELATED APPLICATION

This application is a Continuation-in-Part of application Ser. No. 09/158,418 entitled, "EQUIPMENT LOCKOUT SYSTEM," filed Sep. 22, 1998, now U.S. Pat. No. 6,285,860, issued Sep. 4, 2001.

TECHNICAL FIELD

The present invention relates generally to machine controls in particular to a lockout system for preventing or inhibiting operation of a machine under predetermined operating conditions.

BACKGROUND ART

In the construction industry it is not uncommon to have many workers in the vicinity of a machine being operated to excavate, tunnel, bore, etc. For example, directional drills are commonly used to drill bores under obstacles such as waterways. In addition to the operator of the directional drill, workers are also needed to monitor and operate the "mud" system which is an integral part of many drilling operations. Workers are also needed at the exit hole to attach reamers, pipe casing, etc. to the end of the drill string before it is "pulled back" by the directional drill. In some operations, the workers located at the exit hole are a significant distance from the directional drill itself and may even be out of sight.

Under some circumstances, the workers at the exit hole would like to exert at least indirect control over the directional drill. Accordingly, it is common for workers at the exit hole to be in radio communication with the operator of the directional drill. The operator of the directional drill controls the drilling rig based on the voice commands he or she receives from the workers located at the exit hole.

DISCLOSURE OF THE INVENTION

The present invention provides a new and improved control system that is especially adapted to work in conjunction with construction equipment or other heavy machinery. In particular, the control system provides a lockout function which inhibits one or more functions of the equipment being operated, under predetermined operating conditions. The functions may include power to the hydraulic unit, engine power, power wrench operation, etc.

The equipment lockout control system includes at least one radio receiver that includes an equipment inhibitor device for disabling at least one function performed by the equipment. At least one portable transmitter that is operable by an operator is located on or near the operator. The portable transmitter includes circuitry for generating a substantially continuous radio signal that is receivable by the receiver. Upon detecting an interruption in the substantially continuous radio signal, the receiver renders the equipment inhibitor effective and disables at least one function performed by the equipment. In an embodiment, the substantially continuous radio signal is broadcast in regular periodic bursts.

When used with a directional drill, the receiver may include lockout relays which are normally energized so long as a radio signal between an operator-carried transmitter and the receiver is maintained. If the radio signal is interrupted, the relay(s) is deenergized and a function (such as power for the hydraulic system) is disabled or discontinued.

The transmitter also includes a signal generator for broadcasting a stop signal upon actuation of an operator actuatable stop member forming part of the transmitter.

In the preferred and illustrated embodiment, local operators located near the equipment all carry transmitters which must maintain radio communication with the receiver in order to render the equipment inhibitor ineffective. In a more preferred embodiment, a plurality of remote transmitters are worn by remote operators that may be located a substantial distance from the equipment.

In order to facilitate the radio communication between the remote transmitters and the receiver, in the preferred and illustrated embodiment, a relay/transmitter station is located in the vicinity of the remote operators. In this embodiment, the transmitters worn by the remote operators are in constant radio communication with the relay/transmitter station. The relay/transmitter station, in turn, is in continuous radio communication with the receiver, and its continuous signal is maintained so long as it continues to receive continuous radio signals from the remote transmitters.

Upon interruption of the radio signal broadcasted by the remote transmitters, the relay/transmitter station interrupts its signal to the receiver which, upon sensing the interruption, renders the equipment inhibitor effective. Alternately, the relay/transmitter station may issue a "stop" command which when received by the receiver also renders the equipment inhibitor effective.

According to a feature of the invention, each of the transmitters generates a continuous signal having address and lockout status data. The address identifies the transmitter, and the status data indicates that a stop member (i.e. push button) forming part of each transmitter has not been pressed by the operator. Upon actuation of the stop member, the transmitter begins issuing a continuous radio signal containing address information and a stop command. The receipt of stop command by the receiver causes the equipment inhibitor to be rendered effective, thus disabling at least one function of the equipment.

A specific frequency and/or address is assigned to each transmitter and the receiver recognizes each transmitter by the frequency and/or address. This frequency and/or address assignment can be made using jumper settings in the receiver or by "teaching" the receiver the frequency and/or address for a given transmitter prior to use.

Additional features of the invention will become apparent and a fuller understanding obtained by reading the following detailed description made in connection with the accompanying drawings.

BRIEF DESCRIPTION OF THE DRAWINGS

FIG. 5 is a block diagram representation of the receiver;

BEST MODE FOR PRACTICING THE INVENTION

Figure 1:
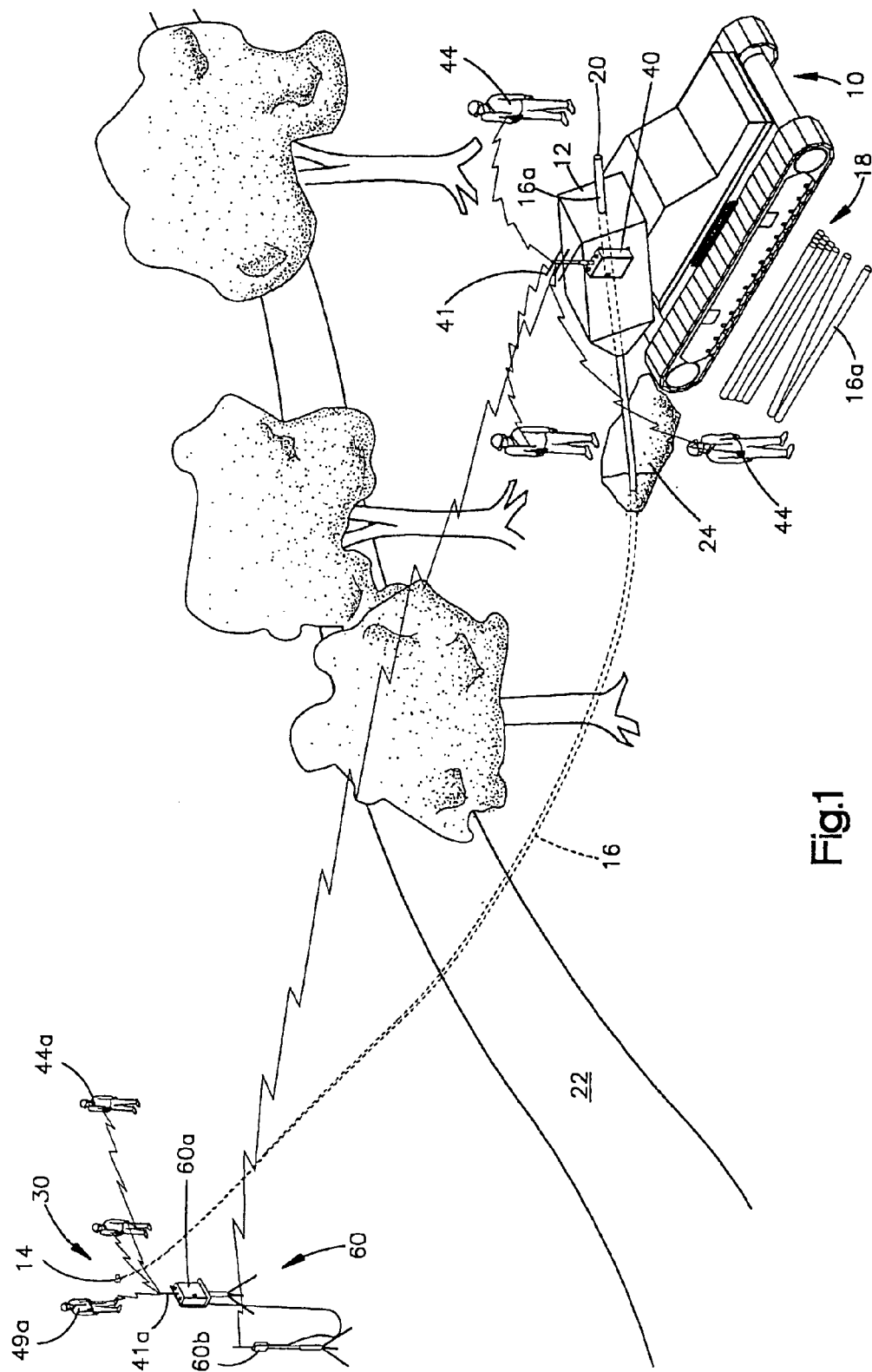
FIG. 1 is a schematic/perspective view showing the disclosed lockout system as it would be used as part of a directional drilling operation.

FIG. 1 illustrates an overall view of an equipment lockout system constructed in accordance with the preferred embodiment of the invention. For purposes of explanation, the present invention will be described in connection with a directional drill 10. The directional drill 10 is of conventional construction and those skilled in the art will recognize the directional drill 10 as being a type of trenchless boring machine that has become quite common in the construction industry. It should be noted that the present invention may be used with other types of equipment such as, but not limited to, conventional boring machines, tunneling equipment, etc.

A typical directional drill 10 includes a carriage mechanism 12 which is designed to rotate, push forward and/or retract a boring tool indicated generally by the reference character 14. The boring tool 14 generally comprises a boring head (not shown in detail) located at the distal end of a drill string 16 that is made up of a series of releasable, interconnected pipe segments 16a. As the drill string 16 is pushed forward, additional pipe segments indicated generally by the reference character 18 are attached to the machine side (indicated by the reference character 20) of the pipe string 16.

In FIG. 1, the directional drill 10 is being used to drill a bore under a waterway 22, which is a common use of this type of equipment. As seen in FIG. 1, the boring operation is usually commenced from a pit 24 that is located just in front of the directional drill 10. The boring head (located at the distal end of the drill string) is guided by a combination of rotation and linear movement which is imparted to the drill string 16 by the pipe carriage 10. As is known, the pipe carriage 16 includes mechanisms for rotating the drill string 16 as well as a mechanism (not shown)for pushing or pulling (retracting) the drill string 16.

As seen in FIG. 1, several operators may be located near or on the directional drill 10. These "local" operators may perform several functions. For example one of the operators may have the responsibility for attaching or removing pipe segments 16a from the drill string as it is moved into or out of the bore hole. Another operator may oversee the operation of a mud system which is often an integral part of the boring operation.

As also seen in FIG. 1, several operators may also be located at the exit hole indicated generally by the reference character 30. For purposes of explanation, these operators will be termed "remote operators". In a conventional boring operation, other tools such as a reamer may be attached to the end of the drill string and then the drill string is "pulled back" by the directional drill 10. In this way the initial bore hole is enlarged. In other operations, a pipe casing may be attached to the end of the drill string and is drawn into the bore hole as the drill string is pulled back.

In at least some drilling operations, the remote operators may be a significant distance away from the directional drill itself and in some cases the remote operators may be out of sight of the directional drill 10 and the local operators. In accordance with the invention, a control system is provided which enables both the local operators and the remote operators to inhibit operation of the directional drill 10. For purposes of explanation the system will be termed a "lockout" system.

In accordance with the preferred embodiment of the invention, the lockout system includes a receiver 40 attached to the directional drill 10 including a receiving antenna 41. Upon receiving predetermined signals, to be described, the receiver 40 may exert control over one or more functions of the directional drill 10. For example, upon receiving a predetermined "stop" signal, the receiver 40 includes componentry which is operative to shut down a power source in order to terminate the drilling operation.

Figure 2:
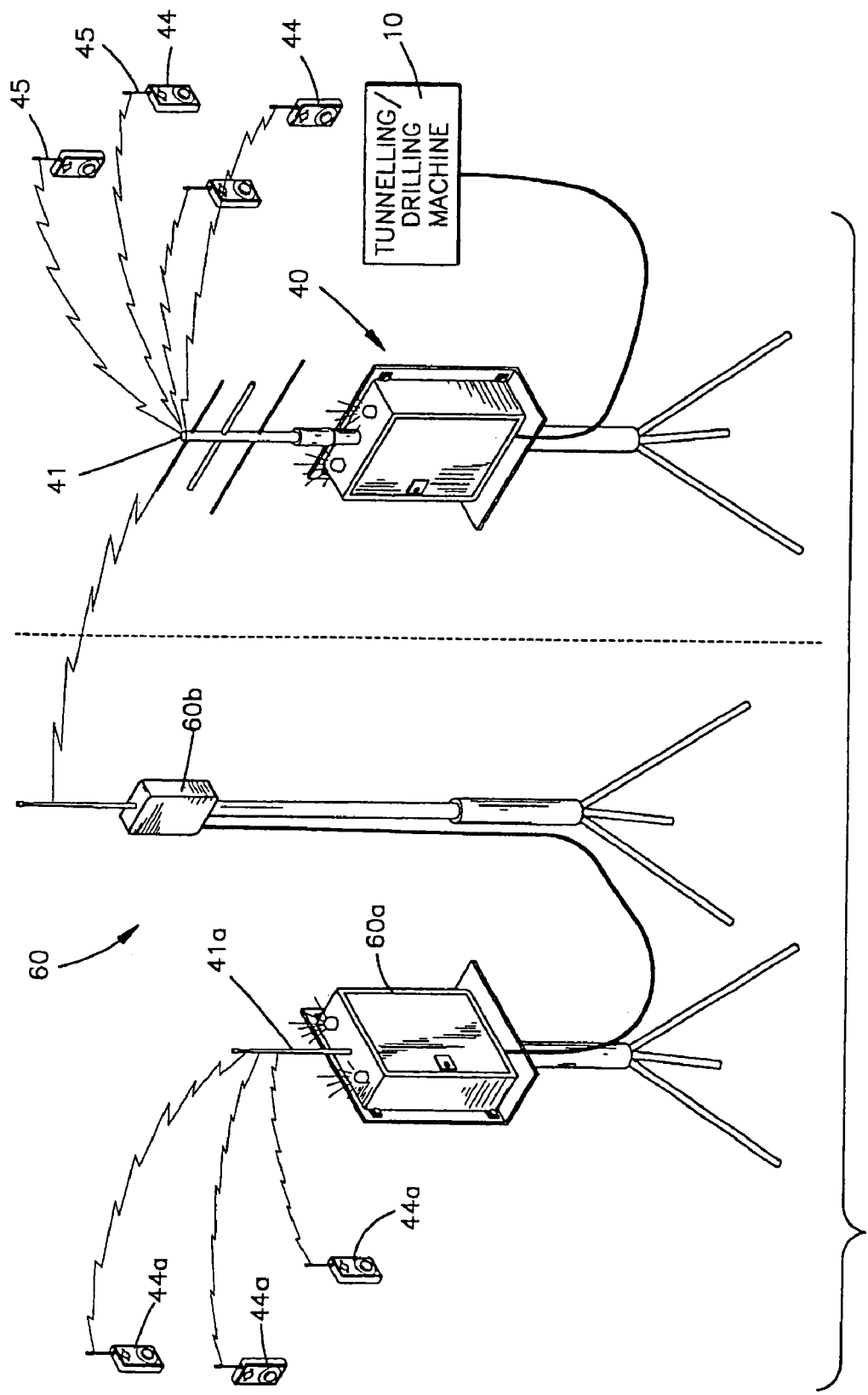
FIG. 2 is a schematic representation of the lockout system.
Figures 3, 4:
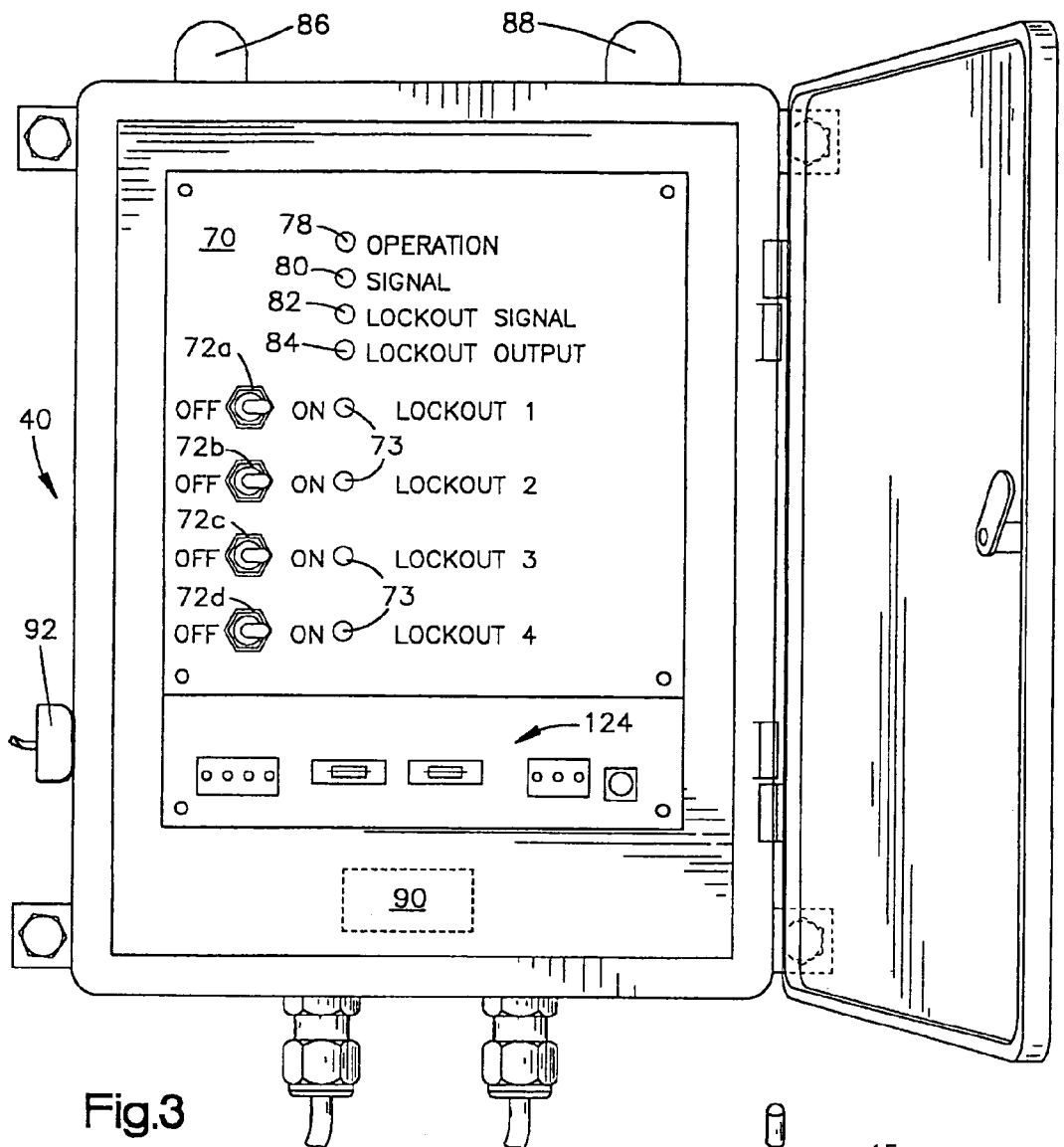
FIG. 3 is a side elevational view showing a side panel of a receiver forming part of the system.
FIG. 4 is a perspective view of a portable transmitter forming part of the lockout system.

In the preferred embodiment of the invention, and referring also to FIG. 2, the receiver 40 is in radio communication with a plurality of transmitters 44 which are worn by the local operators. Each transmitter is assigned a unique address and is preferably given its own transmitting frequency. The receiver 40 is preset to recognize the frequency and address information for each transmitter or the receiver may "learn" the frequency and address information for a given transmitter. To learn the frequency and address of a transmitter, the receiver is set to a learning mode in which a transmitter identity is set and then the transmitter's signal is broadcast to the receiver. The receiver stores the signal with the transmitter identity and will recognize the transmitter based on this stored signal. The exterior appearance of a transmitter 44 is best shown in FIG. 4. According to the preferred embodiment of the invention, each of the transmitters 44 is in constant radio communication with the receiver 40 and each includes an broadcast antenna 45.

In the preferred system, the corruption or interruption of a radio link between any one of the transmitters 44 and the receiver 40 enables a lockout mechanism which inhibits one or more drilling related functions of the directional drill 10. As an example, radio link interruptions may be caused by a component failure in a transmitter, the depletion of battery power in one of the transmitters or the movement of one of the local operators to a position at which radio communication with the receiver 40 is no longer possible.

Referring in particular to FIG. 4, each transmitter 44 preferably includes a stop button 50 which if pressed by the operator will cause the transmitter to issue a "stop" signal. When the "stop" signal is received by the receiver 40, one or more functions of the directional drill 10 are terminated or inhibited. Each transmitter 44 preferably includes a start button 52 which is pressed by the operator to initiate communication with the receiver 40. Status lights are also provided on the transmitters 44. Preferably a green status light 54 flashes constantly when the radio link between the transmitter 44 and the receiver 40 is active. A red light 56 is provided to apprise the operator that a "stop" signal has or is being transmitted.

The remote operators located at the exit hole 30 carry transmitters 44a which in the preferred in embodiment are identical in construction to the transmitters 44 worn by the local operators. The remote, operator carried, transmitters 44a may be in direct radio communication with the receiver 40. However in the preferred embodiment, these operator carried, remote transmitters 44a are in constant radio communication with a relay/transmitter unit 60 which in turn is in constant radio communication with the receiver 40. The preferred system enables the remote operators to be in communication with the directional drill 10 without requiring the use of high wattage transmitters which would require a substantial power source.

Referring also to FIG. 2, the relay/transmitter unit 60 includes a receiver module 60a which may be similar in construction to the receiver 40 that forms part of or is attached to the directional drill 10. In the preferred configuration, the receiver module 60a is operatively connected to a transmitter 60b. As long as radio links are maintained with the associated transmitters 44b, the receiver module 60 maintains the energization of the transmitter 60b.

The signal issued by the transmitter 60b is preferably similar to that of the local transmitters 44 and hence the receiver 40 response to an interruption of the radio link between the transmitter 60b and itself in the same way the receiver 40 responds to an interruption in the radio link between itself and one of the local transmitters 44.

Referring now to FIG. 3, the layout of a control panel 70 forming part of the receiver 40 is illustrated. In the preferred embodiment, a similar panel (not shown) may form part of the relay/transmitter unit 60. The control panel 70 includes a series of transmitter enable switches 72a, 72b, 72c, 72d which are used to enable or disable associated transmitters 44. If four (4) transmitters 44 are to be used, all four switches (as shown in FIG. 3), would be moved to their "on" positions. With the switch positions shown in FIG. 3, radio links with four transmitters 44 have to be maintained in order to permit operation of the directional drill 10. It should be noted that one of the transmitters may be the transmitter 60b forming part of the relay/transmitter unit 60. Switch status lights 73 indicate the "on" position of the switches 72a, 72b, 72c, 72d.

The control panel 70 may also include several additional status lights. A light 78 indicates that the unit is receiving power; a light 80 indicates that radio links have been established with all the active transmitters (as determined by the settings of the switches 72a, 72b, 72c, 72d). A status light 82 indicates that a fault is present (i.e. a radio link has been broken or a stop signal has been received from one of the transmitters 44). A light 84, when lit, indicates that the lockout control is in its normal state, that is, the state which enables operation of the directional drill 10.

The receiver 40 preferably includes external status lights 86, 88. One of the lights, which is preferably blue or green, would signal that radio communication with all of the associated transmitters 44 is present. The other status light which is preferably red, would be activated when a fault condition is present (one or more radio links have been terminated or a stop signal has been received by the receiver 40). In the preferred embodiment, this light is illuminated to indicate that a latching power relay 90 (see also FIG. 3a) has been energized and can only be extinguished by executing a reset sequence i.e. the pressing of reset switch 92(see FIG. 3a).

FIG. 5 schematically illustrates the construction of the receiver 40. As seen in FIG. 5, the receiver 40 includes an RF receiver section 100, a signal decoder 102 and logic control module 106. A power supply 108 may also form part of the receiver and provides the requisite 12 volt and 5 volt supply voltages. The transmitter selector switches 72a–d, shown in FIG. 3 as toggle switches are shown schematically in FIG. 5.

The RF receiver section is considered conventional and is operative to receive the radio signals from the transmitters 44a and 60b and performs some initial signal conditioning. The conditioned signal is then communicated to the decoder 102. The decoder 102 works in conjunction with the receiver control logic section 106 and determines the integrity of the signal being received and decodes the status signals being sent by the transmitters. Upon detection of a signal representing the activation of a "stop" button 50 or in the event of a loss of signal from one of the transmitters 44a, 60b, one or more control relays 120, 122 are energized or deenergized depending on circuit configuration. The contacts controlled by these relays are indicated in FIG. 5 as 120a and 122a.

Figure 3A:
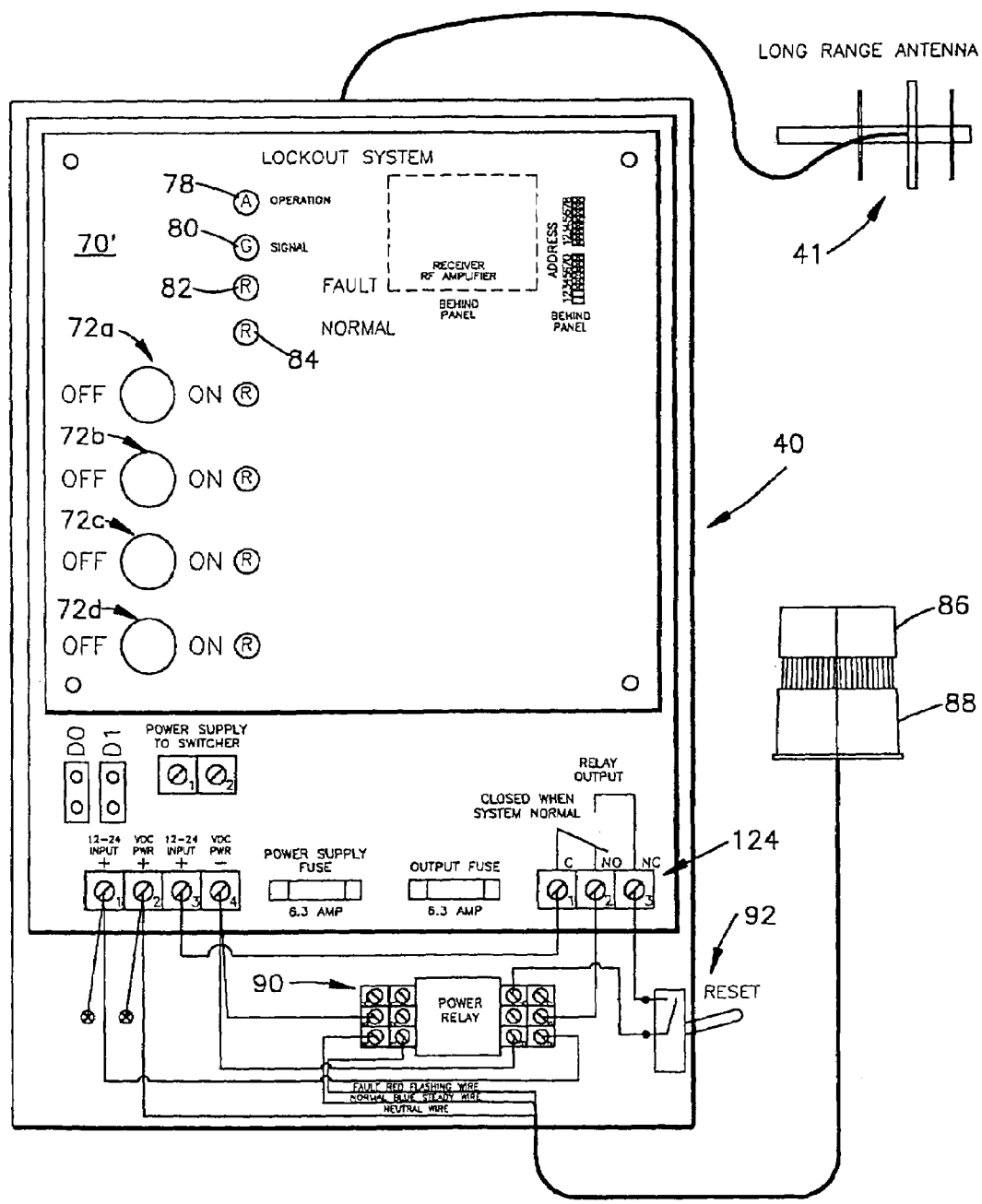
FIG. 3a is a side elevational view showing a side panel of another embodiment of the receiver forming part of the system.

Referring to FIG. 3a, the wire connections to the contacts are shown and indicated generally by the reference character 124. In normal operation, the redundant relay coils 120a, 122a are both energized. As shown in FIG. 3a, when the system is in a "normal" condition, the energized relay coils 120a, 122b cause the normally opened contact to be closed which in turn applies power through an "unlatched" relay coil forming part of a power relay 90. The relay includes contacts which control the operation of a function (such as the hydraulic system) of the directional drill 10. If the radio signal is interrupted or a stop command is issued, the receiver deenergizes one or both of the redundant relay coils 120a, 122a which in turn causes the power relay 90 to latch to an open position, thus interrupting power to the hydraulic system or other function. To reactivate the system, a reset switch 92 must be momentarily pressed in order to energize a latching coil forming part of the power relay 90 which in turn closes contacts for applying power to the hydraulic system (or other subsystem of the directional drill).

The relays include one or more sets of contacts which control a function or functions on the directional drill 10. For example, a first set of contacts of the power relay 90 may control the operation of the hydraulic system forming part of the directional drill 10. When one of the relay coils 120b, 122b is de-energized, the normally opened contacts re-open. This causes the power relay to open and power to the hydraulic unit is interrupted thus suspending the drilling operation.

Figure 6:
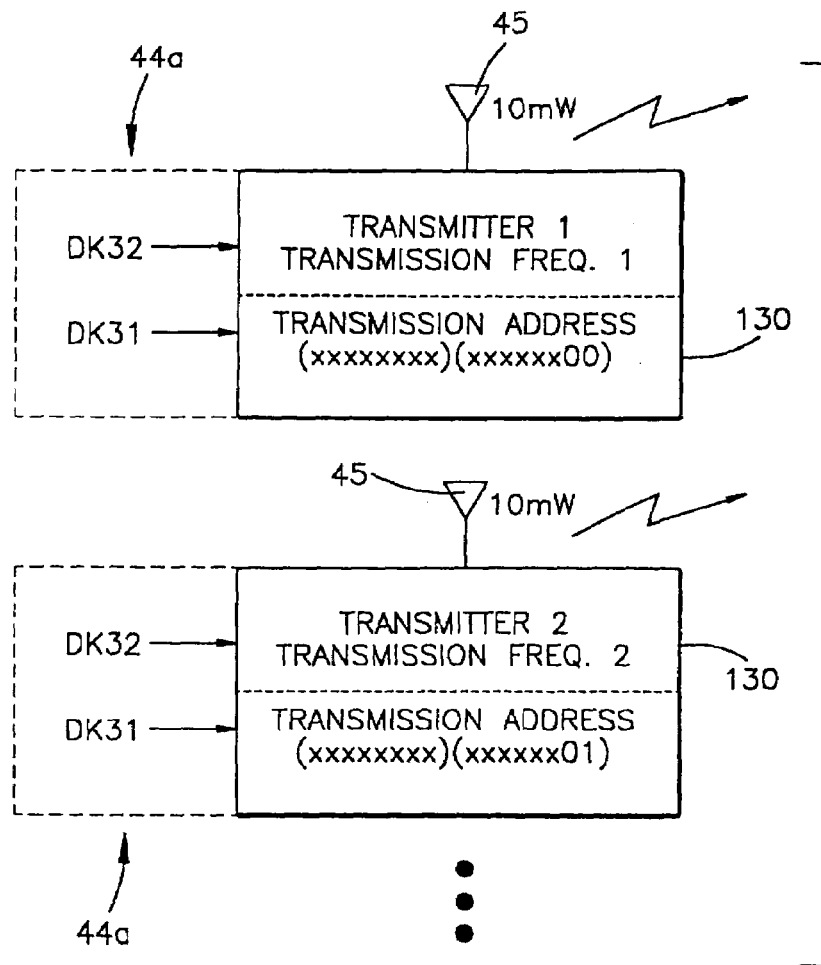
FIG. 6 is a block diagram representation of the portable transmitters forming part of the lockout system.
Figure 7:
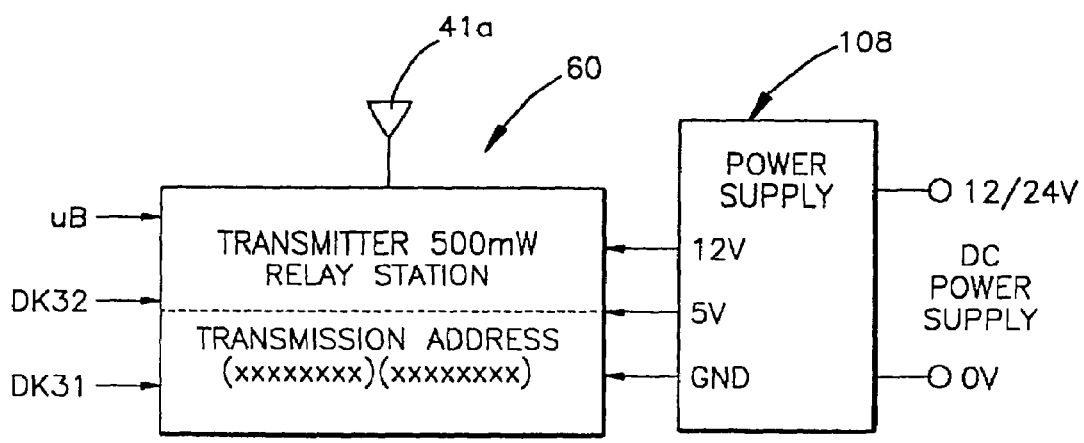
FIG. 7 is a block diagram representation of a relay/transmitter station forming part of the disclosed lockout system.

A block diagram representing the functions of transmitters 44a is shown in FIG. 6. Each transmitter 44 includes RF section 130 which generates and transmits a substantially continuous signal that is to be received and monitored by the receiver 40. One of several transmitting carrier frequencies can be selected for each transmitter. In addition, each transmitter transmits address data which is also selectable. In the preferred embodiment, each transmitter 44a continuously transmits address and status data on its own preset, carrier frequency. More specifically, each transmitter issues a substantially continuous signal which is in the form of a data stream that comprises address data followed by status information followed by address data, etc. These data bytes are emitted at a constant rate under normal operation. The transmission from each transmitter may be continuous or may issue in regularly timed periodic bursts. The receiver 40 expects to receive the address/status data at predetermined intervals. The absence of either one or both of the data bytes within a predetermined interval of time signifies a fault which causes the receiver to energize one or both fault relays 120, 122. The energization of either relay 120, 122 inhibits operation of the directional drill 10.

In the preferred embodiment of the invention, additional reliability is provided by concurrently transmitting two channels of information. The integrity of both data streams must be maintained in order to prevent the deenergization of one or both of the fault relay coils 120, 122. In the illustrated embodiment, one data stream controls the operation of the fault coil 120 whereas the other data stream controls the operation of the other fault coil 122.

As seen in FIG. 5, the fault coil 120 controls the operation of normally closed contacts 120a whereas the fault coil 122 controls the operation of normally opened contacts 122a. Both data streams must be continuous and uninterrupted in order to maintain the redundant relays 120, 122 in their normal, energized positions.

When a stop button 50 is pressed on one of the transmitters 44, the transmitter issues "stop" status data bytes between address data bytes. In particular, after the activation of the stop button 50, the data stream consists of an address byte followed by the stop data byte followed by an address data byte, etc. When the "stop" data signal is received by the receiver 40, the relay coils 120*b*, 122*b* are de-energized in order to terminate a function or the entire operation of the directional drill 10.

The relay/transmitter unit 60 for all intents and purposes operates like the operator carried transmitters 44 except that the signal strength of the relay/transmitter unit is much higher. As long as it continues to receive normal signals from the remote transmitters 44*a*, it will continue to issue normal address/status data and communicate this information via the radio link to the receiver 40. Should a stop button on one of the remote transmitters 44*a* be pressed, the relay/transmitter 60*b* issues a "stop" status byte between each pair of address bytes as part of its signal. If the radio link is lost with one of the remote transmitters 44*a*, the operation of the transmitter 60*b* is terminated thus terminating the signal to the receiver 40. The receiver 40 reacts to the loss of signal from the remote transmitter 60*b* much in the same way it reacts to the loss of a radio link between one of the local transmitters 44 and itself. One or both of the fault relays 120, 122 are energized.

We claim:

1. A construction equipment lockout control system, comprising:
   a) at least one receiver including an equipment inhibitor for disabling at least one function performed by said construction equipment;
   b) at least one portable transmitter operable by an operator associated with said construction equipment, including circuitry for generating a radio signal in periodic bursts receivable by said receiver to enable the operation of said at least one function performed by said construction equipment;
   c) means for rendering said equipment inhibitor effective to disable the operation of said at least one function performed by said construction equipment and means for rendering said equipment inhibitor ineffective, so long as said radio signal from each of said at least one portable transmitters continues to be received by said receiver in periodic bursts, such that whenever said radio signal from any of said at least one transmitters is not received by said receiver said equipment inhibitor is rendered effective; and
   d) said portable transmitter including means for broadcasting a stop signal upon actuation of an operator actuable stop member forming part of said transmitter, wherein broadcast of said stop signal activates said equipment inhibitor to disable said at least one function.

2. The apparatus of claim 1, further comprising a plurality of transmitters, all of which simultaneously issue a radio signal in periodic bursts, said receiver including means for detecting the interruption of any one of said simultaneously issued radio signals and operative to render said equipment inhibitor effective upon detecting an interruption in any one of said radio signals.

3. The apparatus of claim 2, further comprising a second set of portable transmitters located at a remote location, each of said transmitters generating a radio signal in periodic bursts that is receivable by a relay/transmitter station, said relay/transmitter station issuing a radio signal receivable by said receiver, so long as each of said remote portable transmitters maintains radio communication with said relay/transmitter unit.

4. The apparatus of claim 1, wherein each portable transmitter issues a signal having address data and lockout status data.

5. The apparatus of claim 4, wherein the signal is broadcast in regular periodic bursts.

6. A method for operating equipment, comprising:
   a) providing an equipment inhibitor which, when rendered effective, disables at least one function performed by said equipment;
   b) providing a radio receiver including means for rendering said equipment inhibitor effective under predetermined conditions;
   c) providing at least one portable transmitter worn by an equipment operator;
   d) using said transmitter to generate a radio signal in periodic bursts that is receivable by said receiver to render said equipment inhibitor ineffective;
   e) causing said receiver to render said equipment inhibitor effective upon encountering an interruption in said radio signal from any one of said at least one transmitters;
   f) providing an operator actuable member on said transmitter which, when actuated, causes said transmitter to issue an equipment inhibit command; and
   g) upon receiving said equipment inhibit command from said transmitter, causing said receiver to render said equipment inhibitor effective.

7. A construction equipment lockout control system, comprising:
   a) at least one receiver including an equipment inhibitor for disabling at least one function performed by said construction equipment;
   b) a plurality of portable transmitters each operable by an operator associated with said construction equipment, each including circuitry for simultaneously issuing a radio signal in periodic bursts simultaneously receivable by said receiver to enable the operation of said at least one function performed by said construction equipment;
   c) means for rendering said equipment inhibitor effective to disable the operation of said at least one function performed by said construction equipment and means for rendering said equipment inhibitor ineffective, so long as said radio signal from each of said portable transmitters continues to be simultaneously received by said receiver, such that whenever said radio signal from any of said transmitters is not received by said receiver said equipment inhibitor is rendered effective;
   d) said portable transmitter including means for broadcasting a stop signal upon actuation of an operator actuable stop member forming part of said transmitters, wherein broadcast of said stop signal activates said equipment inhibitor to disable said at least one function.

8. An apparatus for disabling at least one function of construction equipment comprising:
   a) at least one radio transmitter worn by an operator of said construction equipment for transmitting an equipment enabling signal in regular periodic bursts;
   b) a receiver for continuously receiving said equipment enabling signal from said at least one transmitter;
   c) an equipment lockout mechanism in communication with said receiver for disabling said at least one function;

d) wherein said receiver activates said equipment lockout mechanism to disable said at least one function whenever an interruption in said signal occurs; and e) an equipment lockout activating member on said transmitter actuable by said operator to transmit an equipment stop signal to said receiver, wherein said receiver activates said equipment lockout mechanism upon receipt of equipment stop signal.

* * * * *